United States Patent [19]
Ratcliffe et al.

[11] 3,860,660
[45] Jan. 14, 1975

[54] PERFLUORO ORGANIC HYDROPEROXIDES

[75] Inventors: Charles T. Ratcliffe, Parsippany; Charles V. Hardin, Morris Plains; Lowell R. Anderson; William B. Fox, both of Morristown, all of N.J.

[73] Assignee: Allied Chemical Corporation, New York, N.Y.

[22] Filed: Mar. 23, 1970

[21] Appl. No.: 22,082

[52] U.S. Cl. ............................................. 260/610 R
[51] Int. Cl. ............................................. C07c 73/06
[58] Field of Search ................................. 260/610 R

[56] References Cited
UNITED STATES PATENTS

| | | | |
|---|---|---|---|
| 2,568,682 | 9/1951 | Levesque | 260/610 |
| 3,541,128 | 11/1970 | Talbott | 260/453 |
| 3,585,218 | 6/1971 | Talbutt | 260/350 |

FOREIGN PATENTS OR APPLICATIONS

| | | | |
|---|---|---|---|
| 827,511 | 2/1960 | Great Britain | 260/610 R |

Primary Examiner—Bernard Helfin
Assistant Examiner—W. B. Lone
Attorney, Agent, or Firm—Roger H. Criss

[57] ABSTRACT

Novel compounds selected from perfluorinated organic hydroxy-hydroperoxides, $HOOC(R_f)_2OH$, such as 2-hydroperoxyperfluoro-2-propanol, $HOOC(CF_3)_2OH$, prepared by the reaction of an alkyl, aryl or alkaryl perfluoro ketone, with hydrogen peroxide; and perfluorohydroperoxides, $R_fOOH$, such as trifluoromethylhydroperoxide, $CF_3OOH$, which are prepared from the above hydroxyhydroperoxides by decomposition at about room temperature. These perfluorinated hydroperoxides are useful as catalysts in the polymerization of polyfluoroolefins. The perfluorohydroperoxides are also useful in the preparation of perfluoroperoxyhypochlorites.

4 Claims, No Drawings

PERFLUORO ORGANIC HYDROPEROXIDES

BACKGROUND OF THE INVENTION

The interaction of hydrogen peroxide with simple ketones (dimethyl, methyl ethyl, diethyl, etc.) generally leads to a mixture of polymeric peroxides. The known addition products of $H_2O_2$ and an aliphatic ketone are usually unstable and generally reported as reaction intermediates for subsequent new peroxide formation. The preparation of stable perfluorinated organic hydroxy-hydroperoxides, $HOOC(R_f)_2OH$, from perfluorinated ketones, by the reaction of hydrogen peroxide with a perfluorinated ketone, as described in the present specification, has not been reported prior to this invention. The decomposition of these perfluorinated hydroxy-hydroperoxides, such as 2-hydroperoxy-hexafluoro-2-propanol, at about room temperature, yields a perfluorinated hydroperoxide, $R_fOOH$, i.e. perfluoromethyl hydroperoxide, and offers an improved synthesis for this perfluoromethyl compound and novel higher analogues, containing up to 12 carbon atoms in the perfluoroalkyl moiety, wherein $R_f$ may be $C_2F_5$, $C_3F_7$ and $C_6F_5$, etc. These homologues have not been reported nor synthesized by the prior art method for the preparation of the perfluoromethyl hydroperoxide. This prior art method is described in a publication by Talbott J. Org. Chem. 33, 2095-2099 (1968).

DESCRIPTION OF THE INVENTION

This invention relates to the preparation of a new class of compounds, organic perfluorohydroxy-hydroperoxides, represented by the general formula:

$$HOOC(R_f)_2OH$$

and the decomposition products of these hydroxy-hydroperoxides, perfluorohydroperoxides, represented by the general formula:

$$R_fOOH$$

wherein $R_f$ may be a perfluorinated lower alkyl moiety having from 1-6 carbon atoms, or a perfluorinated aryl or aralkyl containing up to 12 carbon atoms. The lower alkyl may be straight or branched chained and may be cyclic, such as perfluorocyclohexane. The aryl and aralkyl may be a one ring moiety such as perfluorobenzene or perfluorotoluene.

The novel hydroxy-hydroperoxides are prepared by the reaction of a perfluorinated ketone with hydrogen peroxide in a closed inert system such as glass or inert plastic, such as polytetrafluoroethylene, at temperatures between 0° and +35°C., and preferably for convenience, about 20°-30°C., using standard vacuum techniques under dry conditions. The reaction may take from 5-10 minutes up to about 3 hours, but is usually complete in one half to one hour. It is preferred to use about equimolar proportions or a slight excess of either reactant for best results. Yields are about 95%, based on the $H_2O_2$. Although the reaction will proceed using large excesses of either of the reactants, the use of such excesses becomes impractical. The reaction is conducted under the autogenous pressure developed by the reaction; however, sub- and super-atmospheric pressures will not deleteriously effect the reaction, although these conditions are not preferred.

The perfluorinated hydroxy-hydroperoxides of this invention may be decomposed to yield other novel perfluorinated hydroperoxides as a main volatile product according to the following reaction:

$$HOOC(R_f)_2OH \xrightarrow{R.T.} R_fOOH + CO_2 + \text{other products,}$$

wherein $R_f$ is defined as above. This represents a new and faster method for the preparation of the known $CF_3OOH$ and novel higher homologues depending on the starting perfluorinated hydroxy-hydroperoxide. For instance, $CF_3OOH$ may be prepared in good yield (60-70%) by allowing $HOOC(CF_3)_2OH$ to decompose by standing at about room temperature overnight. This decomposition is convenient at room temperature, but it may be carried out at 10°-15°C. over perhaps a two or three day period, or at 60°-70°C. wherein it may be complete in 8-10 hours, but the yield of desired product may not be as high. This decomposition reaction, therefore, is preferred at 25°-30°C.

The product may be separated from the reaction residue by trap to trap distillation in a glass system in one pass.

The above represents an improved synthesis of the basic perfluoromethyl hydroperoxide, and in addition makes possible the synthesis of novel higher homologues such as, for instance, perfluoroethyl hydroperoxide and perfluorobenzyl hydroperoxide. It is essentially a safe, one-step synthesis requiring simple equipment and inexpensive starting materials. The known method for preparing perfluoromethyl hydroperoxide, as described in Talbott et al supra, is conducted with an unstable bis(fluoroformyl) peroxide, which is reacted with the highly explosive difluorodiazine, to form perfluoromethyl peroxyfluoroformate in very low yields of about 18%. This product is finally hydrolyzed to the perfluoromethyl hydroperoxide. Higher homologues have not been reported by this process because of the difficulties encountered with the relatively highly unstable starting material and risk of explosion during decomposition.

Examples of saturated perfluorohydroperoxides which are made possible by the process of this invention include the following:

| Hydroxy-hydroperoxides | Corresponding Hydroperoxides |
| --- | --- |
| $HOOC(CF_3)_2OH$ | $CF_3OOH$ |
| $HOOC(C_2F_5)_2OH$ | $C_2F_5OOH$ |
| $HOOC(C_3F_7)_2OH$ | $C_3F_7OOH$ |
| $HOOC(C_6F_5)_2OH$ | $C_6F_5OOH$ |
| $HOOC(C_6F_{11})_2OH$ | $C_6F_{11}OOH$ |

Both classes of the above hydroperoxides are capable of catalyzing the polymerization of polyfluoroolefins. Specifically, $HOOC(CF_3)_2OH$, has shown utility as a catalyst in the polymerization of chlorotrifluoroethylene and copolymers of ethylene and tetrafluoroethylene. When used as a polymerization catalyst, it is preferred to utilize those perfluorinated hydroperoxides, wherein $R_f$ is a lower alkyl containing from 1-4 carbon atoms, although both classes of these new hydroperoxides may be utilized as intermediates in the preparation of other useful perfluorinated derivatives. The perfluorohydroxy-hydroperoxides, as stated above, are intermediates in the preparation of perfluorohydroperoxides. The perfluorohydroperoxides are useful as starting material in the synthesis of the corresponding perfluorinated peroxyhypochlorite, $R_fOOCl$, by reaction with chlorine monofluoride. This new class of compounds, perfluoroperoxyhypochlorites, and the method for the preparation of these compounds, are the subject of a copending application Ser. No. 22,081, filed Mar. 23, 1970 by the same applicants. They are prepared by the reaction of a hydroperoxide with chlorine monofluoride using conventional vacuum techniques, in a nickel-monel system at −111°C., according to the following reaction:

wherein $R_f$ may be as described above.

The following examples illustrate specific embodiments of this invention and are not intended to limit the scope thereof.

EXAMPLE 1

Preparation of HOOC(CF$_3$)$_2$OH

A 2 ml. sample of 90% H$_2$O$_2$ was carefully pipetted into a glass aerosol compatability tube under dry nitrogen conditions. After the sample was condensed at −196° and the vessel evacuated, 95 mmoles of hexafluoroacetone was transferred into the container under standard vacuum conditions. The reaction mixture was allowed to warm slowly to room temperature and observed to react smoothly. After about one hour, a clear colorless liquid of low volatility was observed representing about 95% yield based on H$_2$O$_2$. Upon sitting at room temperature, it slowly evolved gaseous products. The clear liquid product, however, could be stored without decomposition, at 0°C. or below. Attempts to manipulate the liquid in the atmosphere enhanced the decomposition, but transfers could be made under dry nitrogen with glass apparatus.

It was identified by its F-19 nmr spectrum and by elemental analysis as HOOC(CF$_3$)$_2$OH. The elemental analysis is as follows:

| %C, | Cal'd. | 18.00 | Found | 17.80 |
|---|---|---|---|---|
| %F, | Cal'd. | 57.00 | Found | 56.35 |

Similar results were obtained when 98% hydrogen peroxide was used in equimolar quantities with hexafluoroacetone. In cases where an excess of hexafluoroacetone was added to the reaction mixture, unreacted hexafluoroacetone was present in the product.

EXAMPLE 2

Preparation of CF$_3$OOH

A sample of 2-hydroperoxy hexafluoro-2-propanol, as prepared in Example 1, was allowed to sit overnight at room temperature and volatile decomposition products were observed. Analysis of the volatile mixture showed CO$_2$ and CF$_3$OOH as the major products. Separation of the mixture was easily accomplished by passing it through traps cooled to −78°, −111°, and −196°C. The trap at −111°C. retained pure CF$_3$OOH while CO$_2$ was collected at −196°C. Identification of CF$_3$OOH was carried out by mass and infrared spectra and elemental analysis. The elemental analysis is as follows:

| %C | Cal'd. | 11.76 | Found | 11.46 |
|---|---|---|---|---|
| %F, | Cal'd. | 55.88 | Found | 54.80 |

EXAMPLE 3

Preparation of CF$_3$OOCl

Conventional vacuum techniques (Kel-F/metal system) were used to condense CF$_3$OOH (1.0 mmoles), prepared in Example 2, and ClF (1.1 mmole) into a 5 ml. Kel-F reaction vessel at −196°C. The reaction mixture was allowed to warm to −111°C. whereupon the reaction proceeded to completion without one hour. A clear yellow product was obtained in nearly quantitative yield from the reaction:

Purification of CF$_3$OOCl was first carried out by pumping off the most volatile impurities, mostly COF$_2$, at −111°C. Removal of HF, the reaction by-product, was accomplished by passing the gaseous mixture through an evacuated tube containing dry NaF at room temperature. The compound was charaterized by its mass spectrum, F-19 nmr and infrared spectra, and elemental analysis.

Having thus described our invention, we claim:

1. A compound having the formula HOOC(R$_f$)$_2$OH wherein R$_f$ is selected from the group consisting of perfluoroalkyl groups having from 1 to 6 carbon atoms and perfluorophenyl.

2. A compound having the formula HOOC(R$_f$)$_2$OH wherein R$_f$ is a perfluoroalkyl group having 1 to 6 carbon atoms.

3. The compound of claim 1 wherein R$_f$ is perfluorophenyl.

4. HOOC(CF$_3$)$_2$OH.

* * * * *